(12) United States Patent
Rozmus

(10) Patent No.: US 10,943,110 B2
(45) Date of Patent: Mar. 9, 2021

(54) BIOMETRIC MATCHING USING NORMALIZED IRIS IMAGES

(71) Applicant: Eyelock LLC, New York, NY (US)

(72) Inventor: John Michael Rozmus, Manor, TX (US)

(73) Assignee: Eyelock LLC, New York, NY (US)

( * ) Notice: Subject to any disclaimer, the term of this patent is extended or adjusted under 35 U.S.C. 154(b) by 0 days.

(21) Appl. No.: 16/451,640

(22) Filed: Jun. 25, 2019

(65) Prior Publication Data

US 2020/0356771 A1  Nov. 12, 2020

Related U.S. Application Data

(60) Provisional application No. 62/690,017, filed on Jun. 26, 2018.

(51) Int. Cl.
*G06K 9/42* (2006.01)
*G06K 9/00* (2006.01)
*G06K 9/62* (2006.01)

(52) U.S. Cl.
CPC ..... *G06K 9/00617* (2013.01); *G06K 9/00906* (2013.01); *G06K 9/42* (2013.01); *G06K 9/6212* (2013.01)

(58) Field of Classification Search
CPC .. G06K 9/00617; G06K 9/42; G06K 9/00906; G06K 9/6212
See application file for complete search history.

(56) References Cited

U.S. PATENT DOCUMENTS

| | | | | |
|---|---|---|---|---|
| 2010/0014718 A1* | 1/2010 | Savvides | ................... | G06T 7/11 382/117 |
| 2012/0075452 A1* | 3/2012 | Ferren | ................. | G06F 3/04886 348/78 |
| 2017/0337424 A1* | 11/2017 | Teverovskiy | ........... | G06F 21/32 |
| 2018/0218213 A1* | 8/2018 | Lee | ........................... | G06K 9/38 |

* cited by examiner

*Primary Examiner* — Chuong A Ngo
(74) *Attorney, Agent, or Firm* — Foley and Lardner LLP

(57) ABSTRACT

The present disclosure describes systems and methods for iris liveness determination. A sensor can acquire a first image of an iris with pupillary constriction, and a second image of the iris without the pupillary constriction. A processor can extract an iris portion of the first image into a first iris image, and an iris portion of the second image into a second iris image. The processor can normalize the first iris image and the second iris image. The normalized first iris image can have same dimensions as that of the normalized second iris image, in pixels. The processor can compute a minimum average difference between values of specific pixels of the normalized first iris image and values of corresponding pixels of the normalized second iris image. The specific pixels can correspond to an innermost annular portion of the iris.

12 Claims, 10 Drawing Sheets

(201) Acquire a first image of an eye with pupillary contraction or dilation, and a second image of the eye without the pupillary contraction or dilation.

(203) Extract an iris portion of the first image into a first iris image, and an iris portion of the second image into a second iris image.

(205) Normalize the first iris image and the second iris image.

(207) Compute a minimum average difference between values of specific pixels of the normalized first iris image and values of corresponding pixels of the normalized second iris image.

(209) Determine that the iris is a live iris, responsive to determining that the computed minimum average difference is below a defined threshold value.

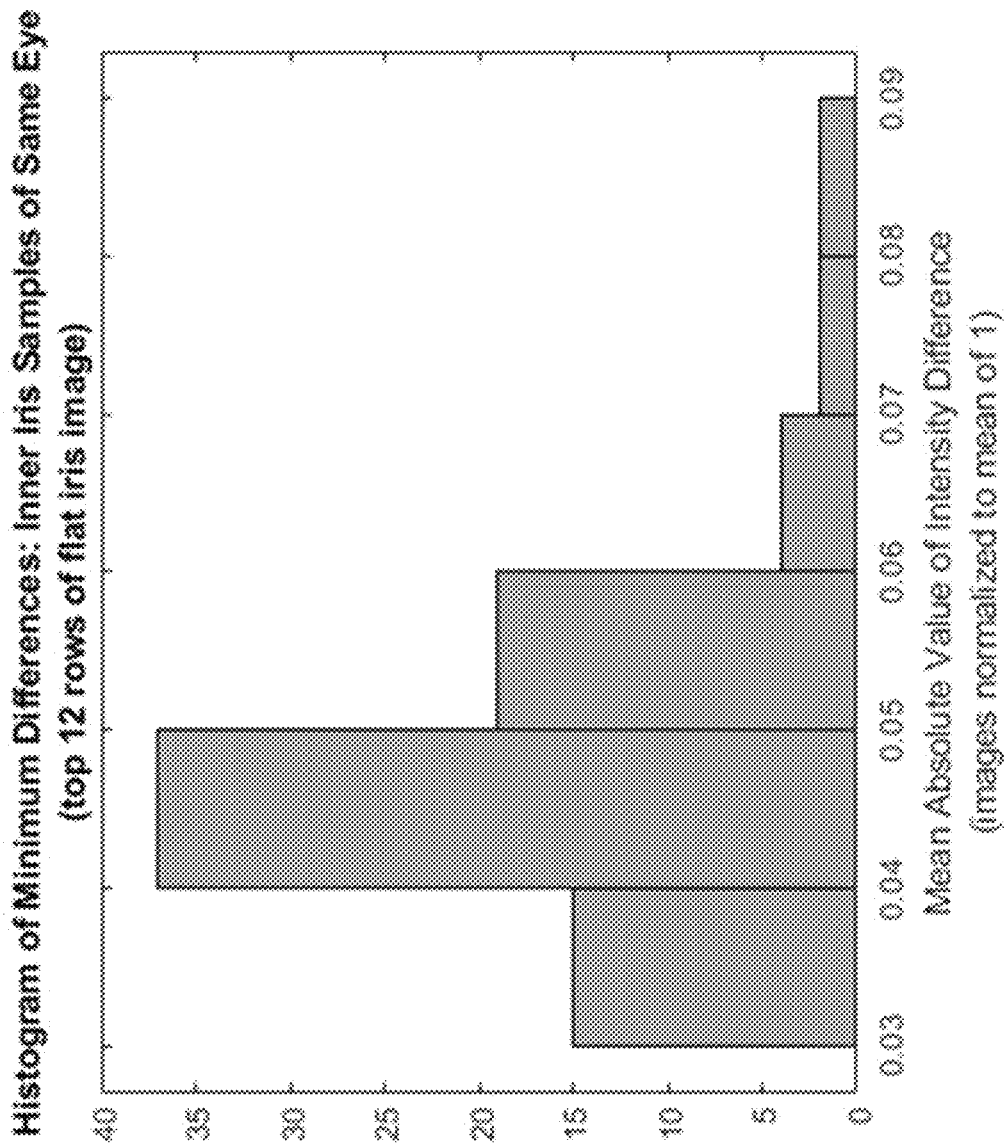

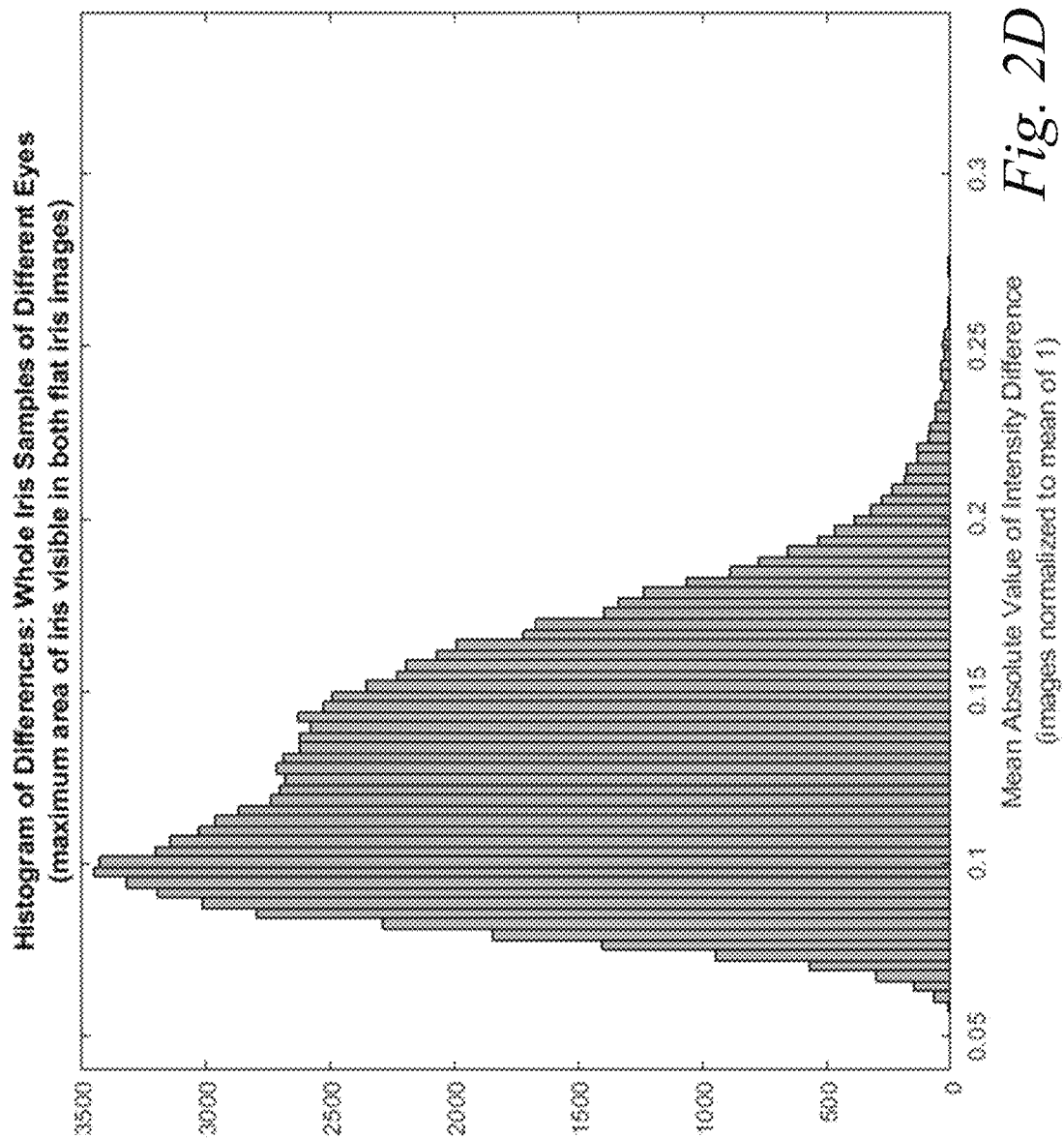

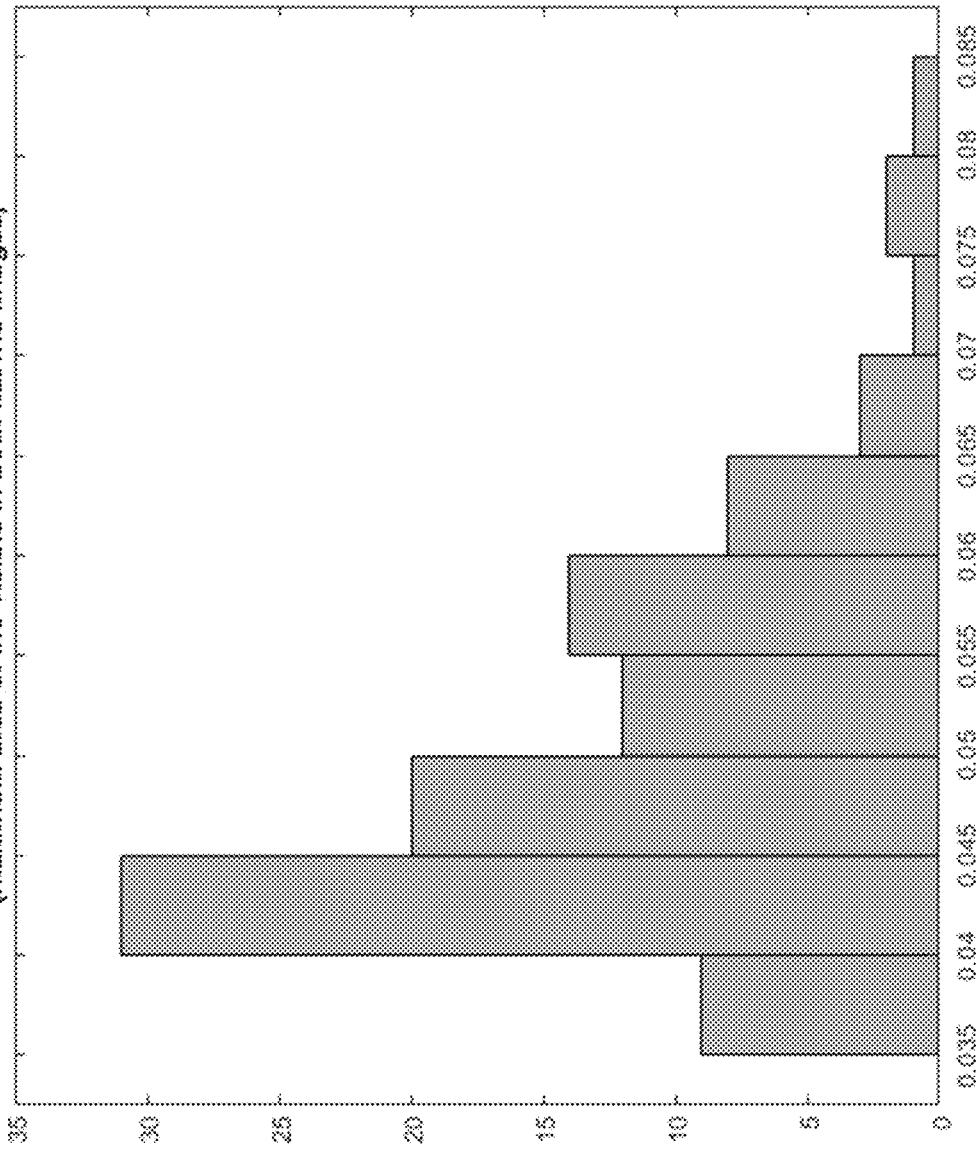

BIOMETRIC MATCHING USING NORMALIZED IRIS IMAGES

CROSS REFERENCE TO RELATED APPLICATIONS

This application claims the benefit of and priority to U.S. Provisional Application Ser. No. 62/690,017, filed Jun. 26, 2018, entitled "BIOMETRIC MATCHING USING NORMALIZED IRIS IMAGES". The entire content of the foregoing is incorporated herein by reference for all purposes.

FIELD OF THE DISCLOSURE

This disclosure generally relates to systems and methods for biometric identification, including but not limited to systems and methods for iris biometric matching and liveness detection without using iris codes.

BACKGROUND

Iris biometric matching or recognition is a leading candidate for controlling access to high security information and facilities, in part because of its very low false acceptance rate while maintaining an acceptable false rejection rate. However, very high quality iris images, such as those reverse-engineered from stolen iris codes for instance, can be printed on contact lenses and provide a threat to existing methods and systems of using iris biometrics for access control. Iris codes are the result of any method of reducing the information contained in an image of an iris, including the well-known method of spatial filtering with wavelets.

SUMMARY

Some embodiments of the present systems and methods relate generally to apparatuses, systems and methods for iris biometric matching. To address spoofing attacks using iris images printed on contact lenses for instance, some embodiments of the present systems and methods can be used to determine if a live eye is present, and where a live eye is present, whether a false iris image is applied on the live eye (e.g., printed on a contact lens) to pass off as a live iris. For example, a light source or other mechanism can be used to trigger a pupillary response (e.g., constriction) that is indicative of the presence of a live eye, and to expose a portion of the live iris that may otherwise be blocked or hidden behind/beneath a false iris image (e.g., printed on a contact lens). An image processor, configured in accordance with embodiments of the inventive concepts disclosed herein, can extract the exposed portion of the live iris for pixel-based image normalization, and pixel-based iris matching against a reference image. If the image processor determines that the pixel-based iris match is above a defined threshold, the image processor can determine that the iris is live and/or matches the reference image. The present solution thus avoids encoding of iris images into iris codes, as well as use of iris codes for liveness verification, and can achieve false acceptance rates (FARs) and false rejection rates (FRRs) suitable for liveness determination and/or iris recognition.

In a further aspect, embodiments of the present systems and methods can perform iris matching without using any iris codes generated from acquired iris images. The iris matching can be performed between iris images while remaining in pixel form, by comparing the pixel intensity values of the iris images. The iris matching can use any suitable portions of the iris images after normalization, or the entireties of the iris images after normalization.

In one aspect, this disclosure is directed to a method for iris liveness determination. The method can include acquiring, by a sensor, a first image of an eye with pupillary constriction, and a second image of the eye without the pupillary constriction. The method can include extracting an iris portion of the first image into a first iris image, and an iris portion of the second image into a second iris image. The method can include normalizing the first iris image and the second iris image. The normalized first iris image can have same dimensions as that of the normalized second iris image, in pixels. The method can include computing a minimum average difference between values of specific pixels of the normalized first iris image and values of corresponding pixels of the normalized second iris image. The specific pixels can correspond to an innermost annular portion of the iris. The method can include determining that the iris is a live iris, responsive to determining that the computed minimum average difference is below a defined threshold value.

In some embodiments, computing the minimum average difference includes circular-shifting the normalized first iris image relative to the normalized second iris image, over a plurality of circular-shifting steps, and can include computing, corresponding to each of the plurality of circular-shifting steps, an average difference between values of pixels of the normalized first iris image corresponding to the innermost annular portion of the iris, and values of corresponding pixels of the normalized second iris image corresponding to the innermost annular portion of the iris. Computing the minimum average difference can include determining the minimum average difference from the computed average differences corresponding to the plurality of circular-shifting steps.

In some embodiments, computing the average difference includes computing a mean of absolute differences between the values of pixels of the normalized first iris image corresponding to the innermost annular portion of the iris, and corresponding values of pixels of the normalized second iris image corresponding to the innermost annular portion of the iris of the normalized second iris image. In some embodiments, the innermost annular portion of the iris corresponds to less than half of a total surface area of the iris. In some embodiments, normalizing the first iris image comprises normalizing intensity values of pixels in the first iris image. In certain embodiments, normalizing the first iris image comprises normalizing intensity values of pixels in the first iris image to a mean of a defined value.

In certain embodiments, the method can include computing the minimum average difference without encoding the first normalized iris image or the second normalized iris image into iris codes. In some embodiments, normalizing the first iris image comprises generating a flat iris image of x rows of pixels by y columns of pixels, wherein x and y are integers. Specific pixels comprising the top or bottom N rows of pixels of the flat iris image of the normalized first iris image can correspond to the innermost annular portion of the iris. An illumination source can provide a first level of light while acquiring the first image of the iris, and providing a second level of light while acquiring the second image of the iris.

In another aspect, this disclosure is directed to a system for iris liveness determination. The system can include a sensor that can acquire a first image of an eye with pupillary constriction, and a second image of the eye without the pupillary constriction. An image processor in communication with the sensor can extract an iris portion of the first image into a first iris image, and an iris portion of the second image into a second iris image. The image processor can normalize the first iris image and the second iris image, the normalized first iris image having same dimensions as that of the normalized second iris image, in pixels. The image processor can compute a minimum average difference between values of specific pixels of the normalized first iris image and values of corresponding pixels of the normalized second iris image. The specific pixels may correspond to an innermost annular portion of the iris. The image processor can determine that the iris is a live iris, responsive to determining that the computed minimum average difference is below a defined threshold value.

In yet another aspect, the disclosure is directed to a method for iris biometric matching. The method can include obtaining a first image and a second image of a same eye or of different eyes. The method can include extracting an iris portion of the first image into a first iris image, and an iris portion of the second image into a second iris image. The method can include normalizing the first iris image and the second iris image, the normalized first iris image having same dimensions as that of the normalized second iris image, in pixels. The method can include computing a minimum average difference between values of pixels of the normalized first iris image and values of corresponding pixels of the normalized second iris image, without encoding the first normalized iris image or the second normalized iris image into iris codes. The method can include determining that the first image and the second image are images of the same eye, responsive to determining that the computed minimum average difference is below a defined threshold value.

In still another aspect, this disclosure is directed to a system for iris biometric matching. The system can include a sensor to acquire a first image for biometric matching with a second image, the first image and the second image corresponding to images of a same eye or of different eyes. An image processor, in communication with the sensor, can extract an iris portion of the first image into a first iris image, and an iris portion of the second image into a second iris image. The image processor can normalize the first iris image and the second iris image. The normalized first iris image can have same dimensions as that of the normalized second iris image, in pixels. The image processor can compute a minimum average difference between values of pixels of the normalized first iris image and values of corresponding pixels of the normalized second iris image, without encoding the first normalized iris image or the second normalized iris image into iris codes. The image processor can determine that the first image and the second image are images of the same eye, responsive to determining that the computed minimum average difference is below a defined threshold value.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan would understand that the drawings primarily are for illustration purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2B depicts a histogram of minimum differences between top 12 rows of flat iris images of each eye, according to some embodiments;

FIG. 2D depicts a histogram of minimum differences for data samples of different eyes, according to some embodiments;

FIG. 2E depicts a histogram of minimum differences for data samples of same eye, according to some embodiments;

DETAILED DESCRIPTION

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods of iris biometric matching.

A. Network and Computing Environment

Figure 1A:
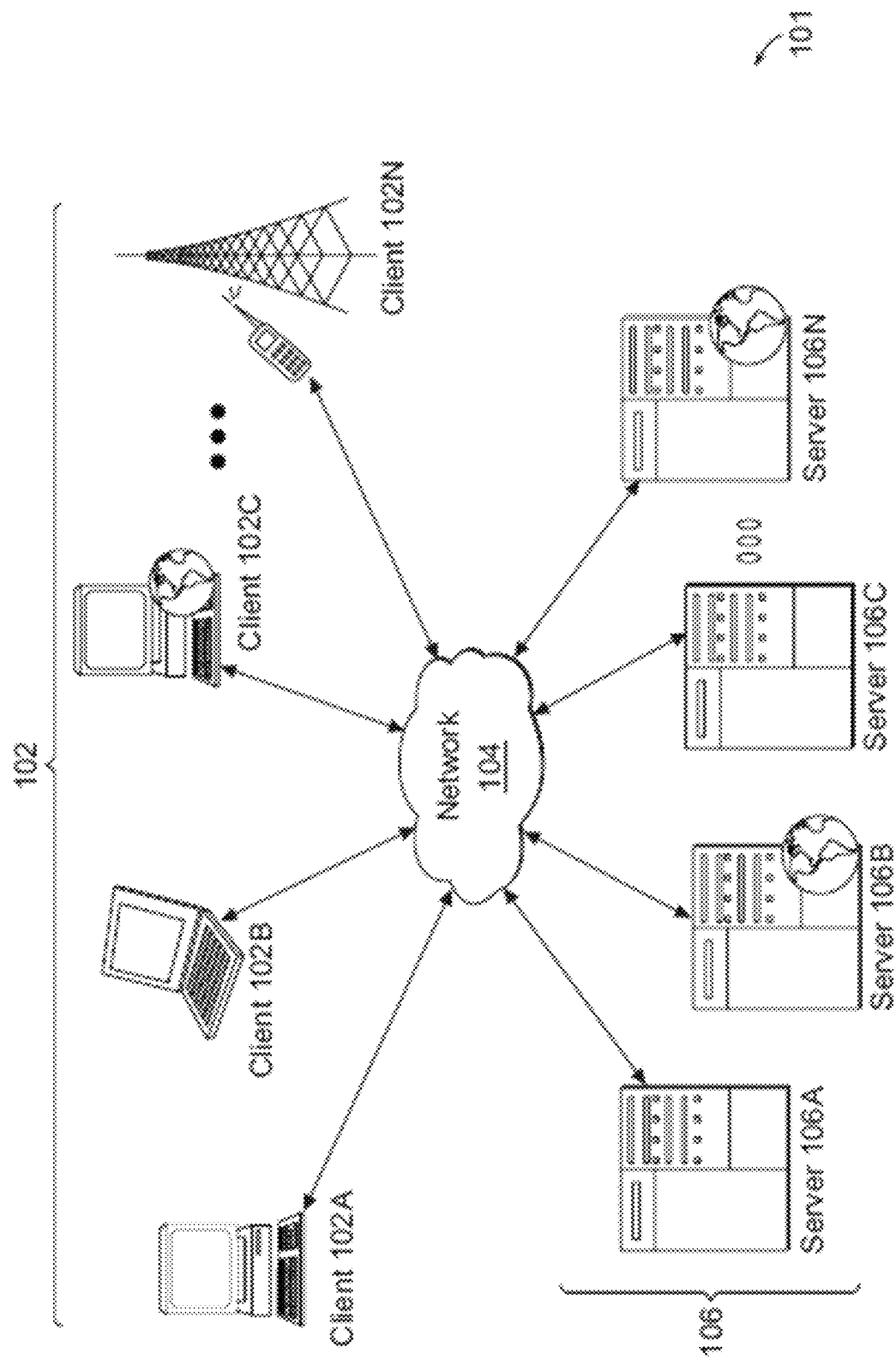
FIG. 1A is a block diagram illustrative of an embodiment of a networked environment with a client machine that communicates with a server.

Before addressing specific embodiments of the present solution, a description of system components and features suitable for use in the present systems and methods may be helpful. FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network 104.

In one embodiment, the computing environment 101 can include an appliance installed between the server(s) 106 and client machine(s) 102. This appliance can manage client/server connections, and in some cases can load balance client connections amongst a plurality of backend servers. The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; 3G; 4G; or any other protocol able to transmit data among mobile devices.

Figure 1B:
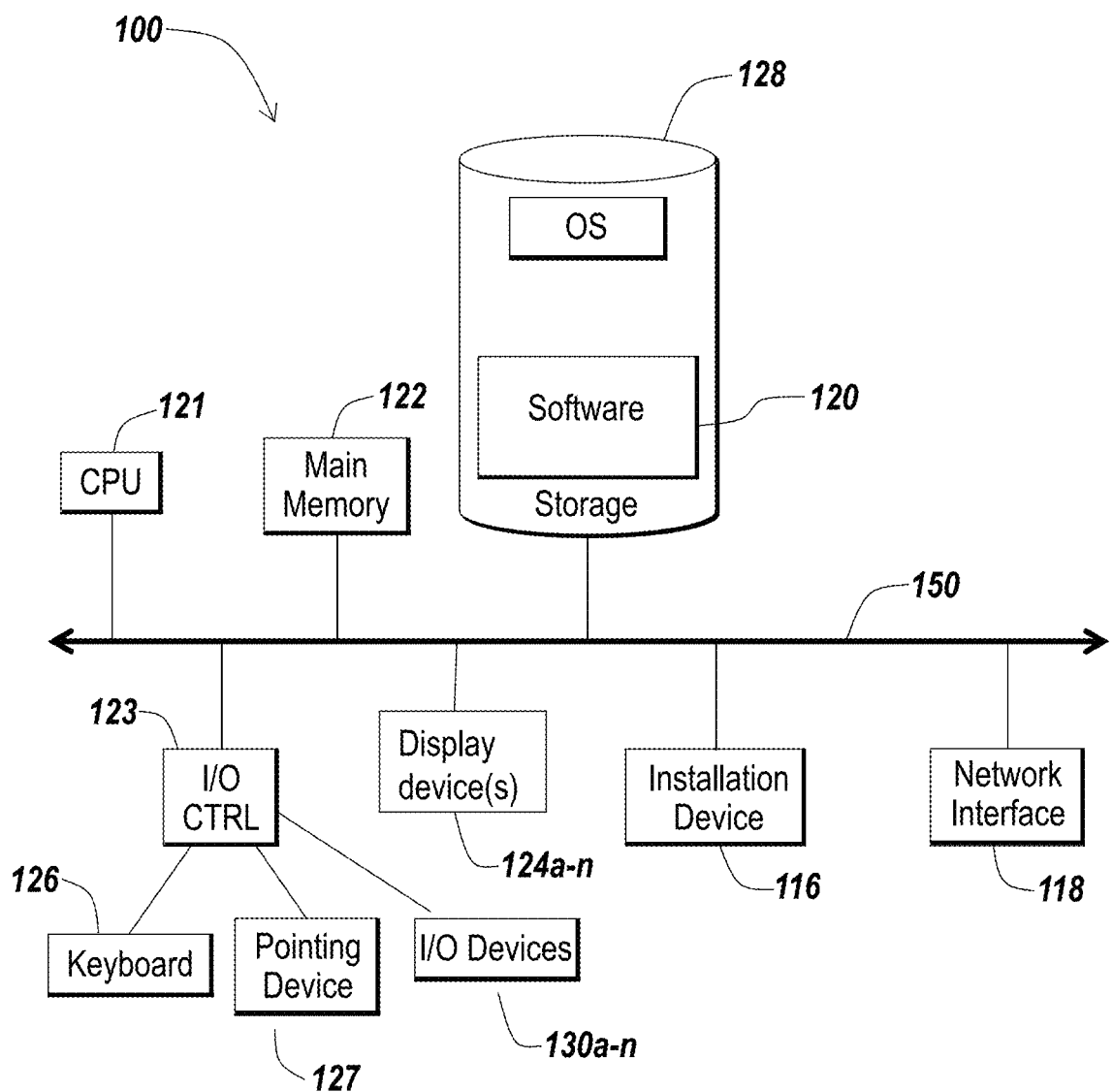
FIGS. 1B and 1C are block diagrams illustrative of embodiments of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, and software 120. The I/O controller 123, in some embodiments, is further connected to a key board 126, and a pointing device 127. Other embodiments may include an I/O controller 123 connected to more than one input/output device 130A-130N.

Figure 1C:
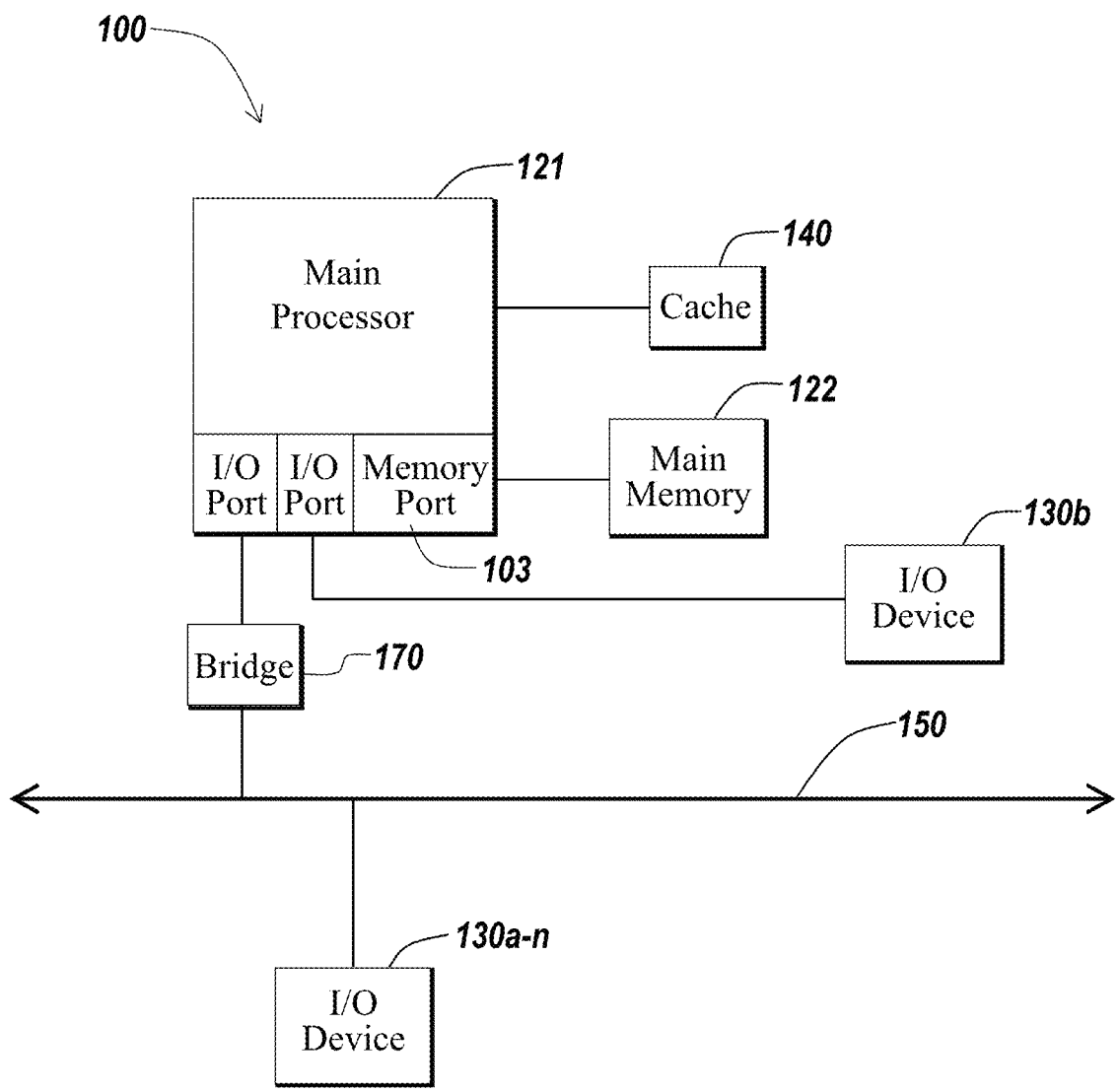

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include an image processor, a graphics processor or a graphics processing unit. The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., built and/or designed for) the systems and methods described herein. Optionally, any of the installation devices 116 could also be used as the storage device. Additionally, the operating system and the software can be run from a bootable medium.

The computing device 100 can include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can execute any operating system, while in other embodiments the computing machine 100 can execute any of the following operating systems: versions of the MICROSOFT WINDOWS operating systems; the different releases of the Unix and Linux operating systems; any version of the MAC OS manufactured by Apple Computer; OS/2, manufactured by International Business Machines; Android by Google; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook, a tablet; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA); any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; an Android phone; or any other handheld mobile device. Having described certain system components and features that may be suitable for use in the present systems and methods, further aspects are addressed below.

B. Iris Biometric Matching

Some embodiments of the present systems and methods relate generally to apparatuses, systems and methods for iris biometric matching. To address spoofing attacks using iris images printed on contact lenses for instance, some embodiments of the present systems and methods can be used to determine if a live eye is present, and where a live eye is present, whether a false iris image is applied on the live eye (e.g., printed on a contact lens) to pass off as a live iris. For example, a light source or other mechanism can be used to trigger a pupillary response (e.g., constriction) that is indicative of the presence of a live eye, and to expose a portion of the live iris that may otherwise be blocked or hidden behind/beneath a false iris image (e.g., printed on a contact lens). An image processor, configured in accordance with embodiments of the inventive concepts disclosed herein, can extract the exposed portion of the live iris for pixel-based image normalization and/or pixel-based iris matching against a reference image. If the image processor determines that the pixel-based iris match is above a defined threshold, the image processor can determine that the iris is live and/or matches the reference image. The present solution thus avoids encoding of iris images into iris codes, as well as use of iris codes for liveness verification, and can achieve false acceptance rates (FARs) and false rejection rates (FRRs) suitable for liveness determination and/or iris recognition.

In a further aspect, embodiments of the present systems and methods can perform iris matching without using any iris codes generated from acquired iris images. The iris matching can be performed between iris images while remaining in pixel form, by comparing the pixel intensity values of the iris images. The iris matching can use any suitable portions of the iris images after normalization, or the entireties of the iris images after normalization.

Figure 2A:
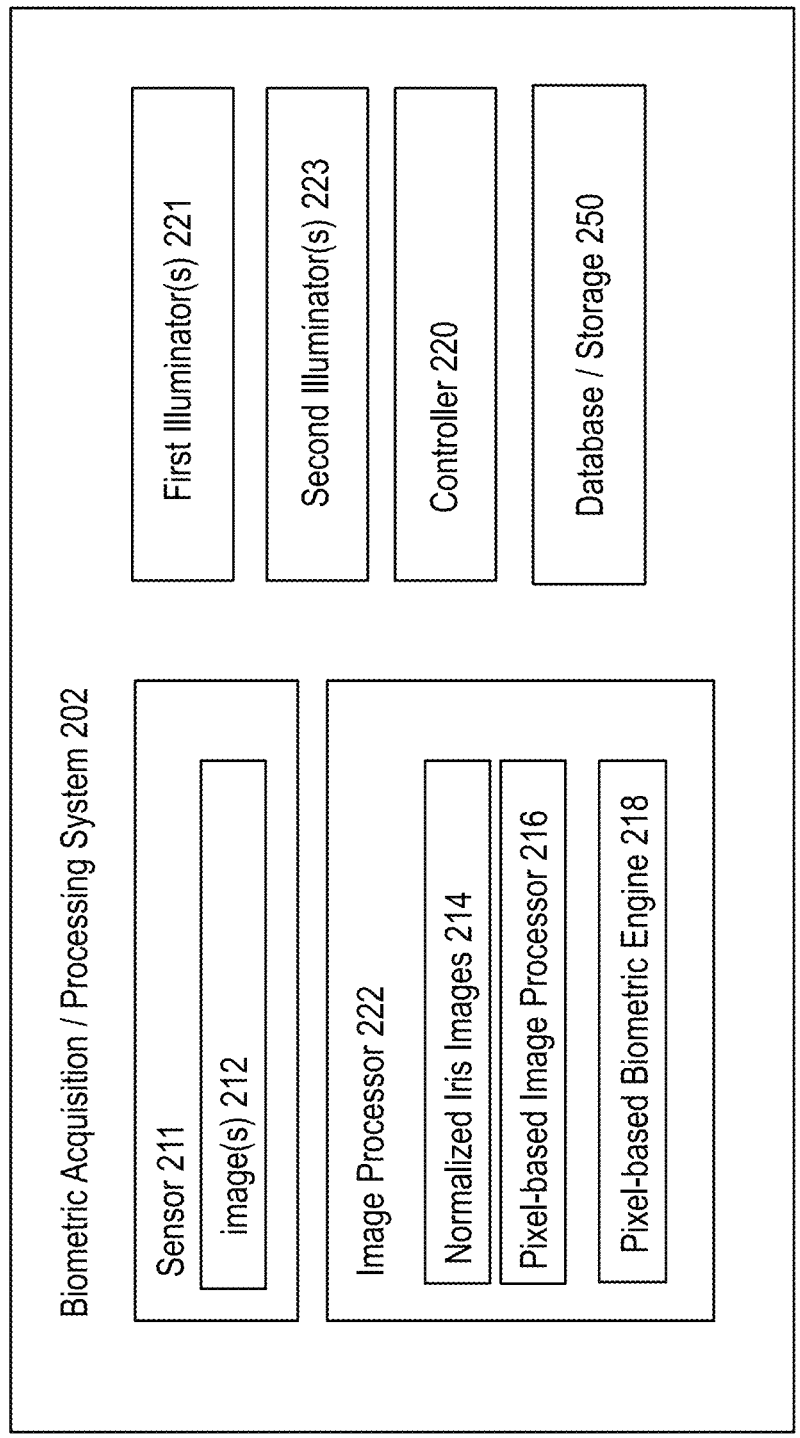
FIG. 2A is a diagram illustrating a system for iris biometric matching, according to some embodiments.

Referring now to FIG. 2A, an embodiment of a system for iris biometric matching is depicted. In brief overview, the system may include a sensor 211 for acquiring one or more images 212, an illuminator 221, a controller 220, a database 250 (or storage device), and/or an image processor 222 with a pixel-based image processor 216 for generating normalized iris images 214, and a pixel-based biometric engine 218.

Each of the above-mentioned elements or entities is implemented in hardware, or a combination of hardware and software, in one or more embodiments. Each component of the system 100 may be implemented using hardware or a combination of hardware or software detailed above in connection with FIG. 1. For instance, each of these elements or entities can include any application, program, library, script, task, service, process or any type and form of executable instructions executing on hardware of the biometric acquisition/processing system 202 for instance. The hardware includes circuitry such as one or more processors in one or more embodiments.

The system can include a sensor 211. The sensor 211 can be configured to acquire iris biometrics or data, such as in the form of one or more images 212. The images 212 can include images of eyes and/or faces that include one or more corresponding irises. The sensor 211 may comprise one or more sensor elements, and may be coupled with one or more filters (e.g., an IR-pass filter) to facilitate image acquisition. The sensor 211 may be configured to focus on an iris (or eye) and capture an iris image of suitable quality for performing iris recognition.

The system may include one or more first illuminators 221 (or one or more illumination sources) to provide light (e.g., near infra-red or otherwise) for illuminating an iris for image acquisition. In some embodiments, the one or more first illuminators 221 can illuminate an iris with any type and/or intensity of light suitable for revealing or enhancing striations or details of the iris for image acquisition and biometric matching. The system may include one or more second illuminators 223 (e.g., visible light illuminators) to provide light to cause a pupillary constriction. A controller 220 can control the one or more first illuminators 221 and/or the one or more second illuminators 223, for instance, to provide light for detecting and/or illuminating the iris. The controller can manage, synchronize or otherwise control the operation of the one or more illuminators 221, one or more visible-light illuminators 223, and the sensor 211, for example to acquire an image during a time period when the one or more illuminators 221 is providing illumination to an iris (e.g., pulsed or strobed illumination) with or without the visible-light illuminators 223 causing pupil constriction.

In some embodiments, the controller 220 uses the one or more second illuminators 223 to cause a pupillary response (e.g., constriction or dilation of a corresponding pupil). By way of a non-limiting example, the controller 220 can control or cause the one or more second illuminators 223 to increase from an initial intensity level, or from zero light output, to an intensity level higher than the initial intensity level or zero light output, that is sufficient (e.g., within a short transition period and/or above a certain difference in intensity levels) to cause a pupillary constriction. As another example, a transition from an initial intensity level to a lower intensity level or zero output can cause pupillary dilation. The controller can use any other mechanism to trigger or cause the pupillary response. The controller can coordinate the operation of the sensor 211 to acquire image(s) of the pupillary response, and the operation of the image processor 222 to detect the pupillary response for instance. The image processor can determine if the acquired images are indicative of the pupillary response, if changes in the acquired images (e.g., dilation or constriction of pupil, or blinking of an eye) occurred proximate to and following a change in the illuminator 223's illumination. The image processor can detect or determine the pupillary response for liveness detection, determination or verification.

In some embodiments, the image processor of the system may operate with the sensor 221 to locate and/or zoom in on an iris of an individual for image acquisition. In certain embodiments, an image processor may receive an image 212 from the sensor 211, and may perform one or more processing steps on the image 212. For instance, the image processor may identify a region (e.g., an annular region) on the image 212 occupied by the iris. The image processor may identify an outer edge or boundary, and/or an inner edge or boundary of the iris on the image, using any type of technique (e.g., edge and/or intensity detection, Hough transform, etc.). The image processor may segment the iris portion according to the inner (pupil) and outer (limbus) boundaries of the iris on an acquired image. In some embodiments, the image processor may detect and/or exclude some or all non-iris objects, such as eyelids, eyelashes and specular reflections that, if present, can occlude some portion of iris texture. The image processor may isolate and/or extract the iris portion from the image 212 for further processing. The image processor may extract and/or provide a segmented iris annulus region for further processing.

In some embodiments, the image processor may translate, map, transform and/or unwrap a segmented iris annulus (sometimes referred herein as segmented image or segmented iris image) into a rectangular representation, e.g., using a homogeneous rubber-sheet model and/or dimensionless polar coordinates (radius and angle) with respect to a corresponding center (e.g., a corresponding pupil's center). For example, the image processor can generate or produce a flat (or rectangular) iris image of x rows of pixels by y columns of pixels, wherein x and y are integers. As an example, a flat iris image can correspond to a 64×480 image, although flat iris images can have other x and/or y value(s). In some embodiments, the size of the rectangular image and partitioning of the polar coordinate system are predetermined or fixed. This procedure is sometimes herein as part of iris normalization, and can compensate for or normalize against pupil dilations and/or constrictions. The image processor 222 may map or translate the iris portion of the image 212 from Cartesian coordinates to a rectangle in the polar coordinates (polar rectangle). The polar rectangle, or rectangular form of the iris data or segmented image, is sometimes referred herein as an extracted (iris) image.

In some embodiments, the image processor may normalize a segmented iris image (in annular form), without translating the segmented iris image into a rectangular representation. For example, the image processor may translate, map or transform a segmented iris annulus into a standardized annular image (or other standardized image) with specific dimensions and/or pixel distribution or density. For example, the standardized annular image can have fixed inner and outer radiuses relative to a corresponding pupil's center, and can be described by a specific number of image pixels. Other examples for a standardized image can include a square-shaped image, a circular image, or an image in a different shape. These standardized forms of images shall also be generally referred herein as extracted (iris) images.

In some embodiments, the image processor can include one or more components for performing one or more types of iris data processing. For instance, the image processor may include one or more components for performing different types of iris data processing (e.g., feature extraction engine to segment an iris portion of an image, intensity normalizing component for normalizing pixel intensity within an image). Each of these components is implemented in hardware, or a combination of hardware and software, in one or more embodiments.

In certain embodiments, the image processor may normalize intensity values of pixels in an extracted iris image. In some embodiments, the image processor may normalize intensity values of pixels in an extracted iris image in annular or rectangular form, or otherwise. The image processor may normalize, adjust, scale or re-distribute the intensity values of pixels in the extracted or segmented iris image to have a mean (or average value) corresponding to a defined value. In some embodiments, the mean can correspond to a normalized value. The defined value can be 1 for instance, or another value such as 0.5, 0.8, 1.5, 2, and so on. The image processor may perform a pixel-by-pixel adjustment or scaling, according to each pixel's intensity value relative to the defined value for the image. For example, to re-distribute the intensity values of pixels in the extracted or segmented iris image to have a mean of 1, the image processor can calculate the average intensity value across pixels of the extracted or segmented iris image, and can adjust the intensity value of each of the pixels by dividing the corresponding intensity value with the calculated average intensity value. The image processor may perform a pixel-by-pixel adjustment or scaling, so as to maintain the details of the iris in the image, and/or to improve the contrast between the details and other features of the image. The image processor may perform the intensity normalization to shift or re-distribute the pixel intensity values of the image within a defined range, for comparison against other image(s) having pixel intensity values distributed within the same defined range for instance.

The intensity-normalized form of the iris image is sometimes referred herein as a normal or normalized iris image 214, or a normalized intensity field, or a variant thereof. Because annular and normalized iris images can be obtained from each other by an almost reversible (e.g., excluding small interpolation errors) transformation, the two forms of iris images can bear or hold much the same information. It should be noted that the normalized iris image(s) can be used for iris biometric matching or comparison as discussed herein, without being processed by any iris encoder, or processed into iris code(s) (e.g., using 2D complex-valued Gabor filters to compute an iris code, 2D real-valued Haar-like filters, or wavelet transform/filtering).

The image processor can perform iris biometric matching or comparison between two normalized images. The two normalized images can include one corresponding to an iris image acquired without pupillary response, and one corresponding to an iris image acquired with pupillary response. In some embodiments, the two normalized images can include one corresponding to an acquired iris image, and one to be used as a reference image (e.g., an enrolled template image, which may be retrieved from a stored database for biometric matching or comparison).

In some embodiments, the iris biometric matching or comparison can be used to address spoofing attacks that use iris images printed on contact lenses for instance. The iris biometric matching or comparison can be used to determine (e.g., when a live eye is present), whether a false iris image is present (e.g., printed on a contact lens) to pass off as a live iris. As described above, a light source or other mechanism can be used to trigger a pupillary response (e.g., constriction) that is indicative of the presence of a live eye, and to expose a portion of the live iris (in at least one of the acquired images) that may otherwise be blocked or hidden behind/beneath a false iris image (e.g., printed on a contact lens). The image processor can identify portions (pixels) of the normalized iris images that would correspond to (and/or include) the exposed portion of the live iris.

The actual portions or pixels of the normalized iris images that would correspond to (and/or include) the exposed portion of the live iris may depend on the level of pupillary response for instance. However, pixels of the normalized iris images can be identified that each has a certain probability (e.g., 90%, or 95%) of being within the exposed portion of the live iris for example. For a normalized image in rectangular form (e.g., of 64×480 in dimension), the image processor can select specific pixels of an normalized iris image corresponding to the innermost annular portion of the iris, which can correspond to pixels in the top or bottom N rows of pixels of the flat iris image. By way of illustration, N can be specified as 6, or 12 or a different value. The image processor can select pixels corresponding to the innermost annular portion of the iris, which can corresponds to less than half (or other value) of a total surface area of the iris. Accordingly, regardless of the shape or form of the normalized image, the image processor can select particular pixels within the innermost annular portion of the iris, that are likely to be within and/or correspond to the exposed portion of the live iris.

The image processor can perform iris biometric matching or comparison on the identified pixels (portion) of the normalized iris images. The image processor can compute, calculate or other determine a minimum average difference between values of the pixels identified in one of the normalized iris images and that of another of the normalized iris images. For example, the image processor can perform circular-shifting on a normalized first iris image relative to a normalized second iris image, over a plurality of circular-shifting steps (e.g., of 12 degrees each, or other value). Circular-shifting can correspond to virtually rotating an iris image relative to another iris image for biometric comparison, because two images can have irises that are not aligned in rotational orientation with respect to each other when individually acquired. Circular-shifting can refer to selection, identification and/or use of an updated distribution or set of pixels in a first normalized image, for comparison against a reference set of pixels in a second normalized image, the updated set representing a rotation of the first normalized image about a center of a corresponding pupil.

The image processor can compute, calculate or determine, corresponding to each of the plurality of circular-shifting steps, an average difference between values of pixels of the first normalized iris image corresponding to the innermost annular portion of the iris, and values of corresponding pixels of the second normalized iris image corresponding to the innermost annular portion of the iris. For instance, the image processor can determine a difference between an intensity value of a pixel of the first normalized iris image and that of a pixel (e.g., corresponding in spatial location to the pixel of the first normalized iris image) of the second normalized iris image. The image processor can determine a difference between each corresponding pair of pixels between the two normalized iris images, and can compute an average of the differences (average difference) determined at each circular-shifting step. In some embodiments, the image processor can compute the average difference by computing a mean (or average) of absolute differences between the values of pixels of the first normalized iris image corresponding to the innermost annular portion of the iris, and corresponding values of pixels of the second normalized iris image corresponding to the innermost annular portion of the iris of the normalized second iris image.

The image processor can determine a minimum average difference from among the computed average differences corresponding to the plurality of circular-shifting steps. This minimum average difference can correspond to a relative orientation between the two normalized images (at a particular circular-shifting step) that is most closely aligned with each other, as compared to relative orientations at other circular-shifting steps. This minimum average difference can correspond to a relative orientation between the two normalized images (at a particular circular-shifting step) that provides a best match between the two normalized images, as compared to relative orientations at other circular-shifting steps The image processor can compare the minimum average difference with a defined threshold value. The defined threshold value may be set or selected to provide a suitable FAR and/or FRR for a specified biometric matching application. The iris biometric matching can be considered successful if the minimum average difference is below the defined threshold. Otherwise the matching may be rejected as unsuccessful. If matching is successful, the image processor can determine that the iris is a live iris. In this regard, if both images are acquired from a same iris without attempted spoofing using a printed contact lens, the acquired images would belong to the same iris regardless of the pupillary response, and matching (based on minimum average difference) would likely be within the defined threshold. Stretching of the iris pattern due to pupillary constriction can be compensated via the normalization process. Hence, the method described above can verify that the iris images being compared are from a live eye that was subject to pupillary constriction. On the other hand, if there is attempted spoofing, the iris image printed on the contact lens would not belong to the live eye. Hence, the imaged portion of a live iris exposed due to pupil constriction, would not match well (e.g., its minimum average difference would not be within the defined threshold) against the iris image printed on the contact lens.

In some embodiments, aspects of the operations described above can be represented in the following function written in Matlab programming language:

```
function Diff = SubInnerFlatIris2 (I,J,NumRows)
% I and J are 64 x 480 normalized (flat) iris images to be compared by
% subtraction of normalized intensities.
%
% NumRows is the number of inner rows of the two irises to be
compared.
%
% Extract sub-images of inner rows.
I_inner = I (1:NumRows,:);
J_inner = J (1:NumRows,:);
%
% Normalize intensities to a mean of 1.
I_mean = mean2 (I_inner);
J_mean = mean2 (J_inner);
I_inner_norm = single (I_inner)./I_mean;
J_inner_norm = single (J_inner)./J_mean;
% Use circular shift of columns to compensate for rotational misalignment
% (+/- 12 degrees).
Diff = 1;
J_shift = circshift (J_inner_norm,-16,2);
for ShiftPositions = 1:33
    J_shift = circshift (J_shift,1,2);
    %imtool (J_shift);
    % Compute mean of the absolute value of the corresponding pixel
    % differences.
    Diff_temp = mean2 (abs (I_inner_norm - J_shift));
    % Select smallest difference.
    if Diff_temp < Diff
        Diff = Diff_temp;
    end
end
end
```

The operations can include comparing each single pixel in the inner region of the two iris images before and after the pupillary response, and avoiding the reduction of information caused by any iris encoding (such as wavelet filtering). The image processor can perform iris segmentation and normalization to minimize variation due to registration error between corresponding pixels. The stretch or shrink of a real iris can be corrected by normalization to a flat iris, and the difference between the two images would become small enough to allow for biometric matching. If part of the inner region of the iris includes a false printed iris, the difference between the two images would be much greater.

Performance Testing

To test for performance of aspects of the systems and methods described herein, a simulation of impersonation can be setup with the following illustrative conditions:
1. Assume that the iris of an individual to be impersonated may be printed "perfectly" on a contact lens, that is, the printed iris can look exactly the same as the real iris to the image sensor.
2. Use a contracted/constricted iris radius only 9% greater than the dilated iris radius. (Six rows of the 64 rows of a 64×480 flat iris image can represent a real iris peeking out from underneath a false printed iris when the pupil is contracted.)
3. From a database of 7000 iris images, 640 images are selected, each having a minimum iris brightness and a minimum focus quality based on gradient. (This can be to ensure adequate signal to noise ratio and detail in the selected iris images.)
4.

Step a: Taking the selected set of 640 64×480 flat iris images, for each of the 79 different eyes in the set having at least two images with the top 12 rows unobstructed, find the two flat iris images of that eye with the least difference between them in the top 12 rows and record that difference. A histogram of the results is illustrated in FIG. 2B. In this example, it is noted that there are only two images to choose from for the worst three matches in the right side of this histogram.

Figure 2C:
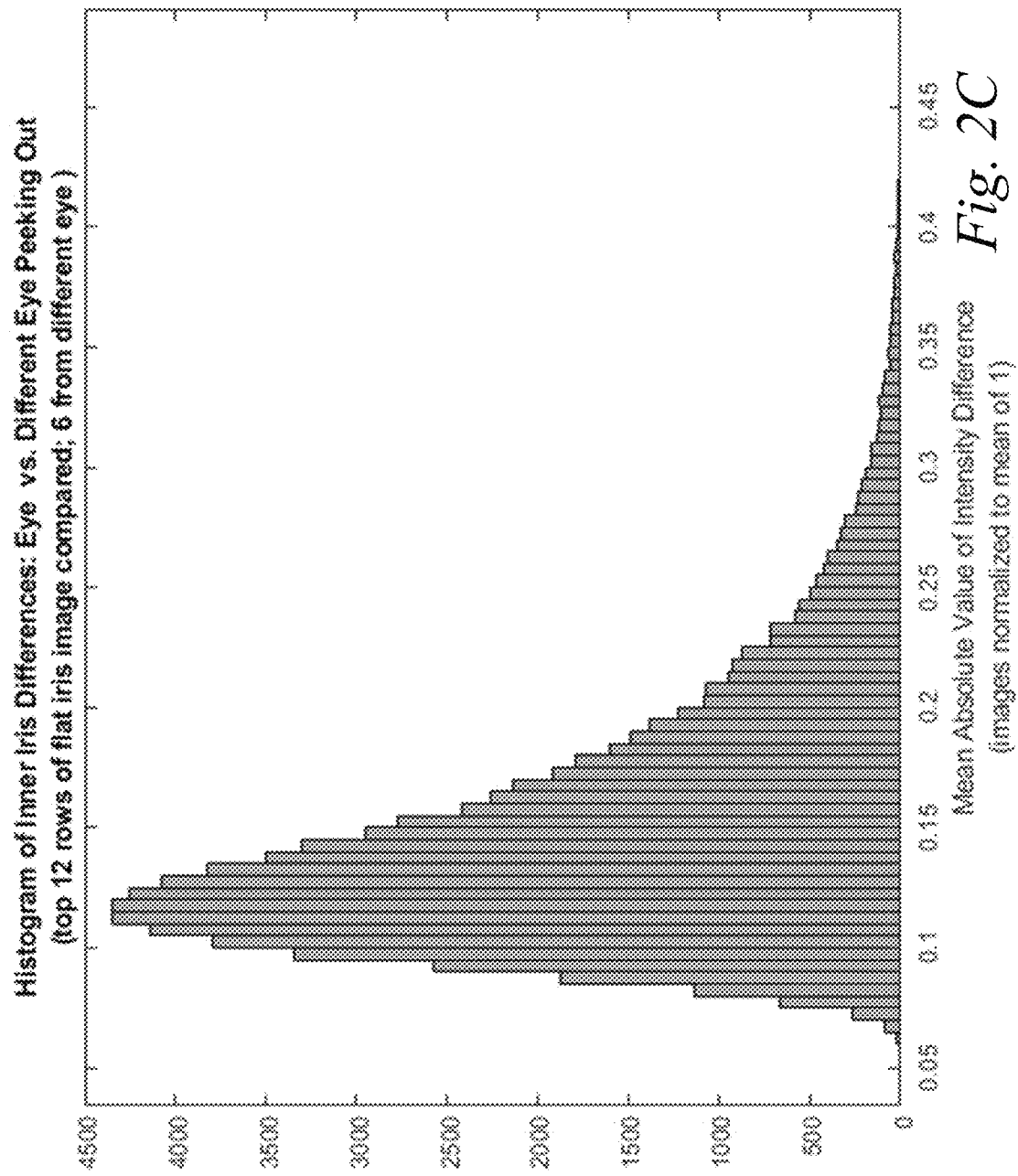
FIG. 2C depicts a histogram of results to simulate real iris peeking out from a print of a different iris print, according to some embodiments.

Step b: Each flat iris image A can be compared to each flat iris image B from any different eye as follows: (a) Vertically concatenate the top 6 rows of A with the top 6 rows of B, simulating a real iris A peeking out from under a different iris B printed expertly on a contact lens; and (b) Find the difference between this concatenation and the top 12 rows of B. A histogram of the results is illustrated in FIG. 2C.

The results of Step a may be improved by better illumination control and more images to choose from. But even with the results shown, we can choose a decision threshold of 0.09 to decide between a match—a normalized real iris looks the same after stretching about 9% (6/64)—and a real iris peeking out from underneath a printed false iris after stretching about 9%. The results for this test set are FRR=0% and FAR=5% (95% probability of catching the spoof).

Using the method described herein, the simulation described above uses about 19% (12/64) of the iris to effectively distinguish authentic matches from mismatches with iris images fabricated from two genuine iris images. Hence, aspects of the method described herein can be applied using a larger portion of the iris to do iris recognition without iris codes. This is possible because iris encoding is a feature extraction containing less information than the flat iris images. Iris encoding may be effective in tolerating random noise and other imaging quality problems, but adequate lighting and good focus can reduce these problems to an insignificant level.

Iris Recognition without Iris Codes

In some aspects, some embodiments of the present systems and methods can be used to perform iris matching without using any iris codes generated from acquired iris images. The iris matching can be performed between normalized iris images while remaining in pixel form, by comparing the pixel intensity values of the iris images. The two normalized images can, for instance, include one corresponding to an acquired iris image, and one to be used as a reference image (e.g., an enrolled template image, which may be retrieved from a stored database for biometric matching or comparison). The normalization process can include elements of the normalization process described above in connection with FIG. 2A. However, the iris matching (e.g., to determine minimum average difference) can use any suitable portions of the iris images after normalization, or the entireties of the iris images after normalization. The portions of the normalized iris images being identified for biometric comparison may not be limited to those corresponding to the exposed portion due to pupillary constriction. Biometric matching or comparison can be performed between the normalized iris images (or portions thereof) according to any aspect of the biometric matching or comparison discussed above in connection with FIG. 2A.

As a test for performance, and using the same set of 640 flat iris images selected for brightness and good focus, the following may be performed by way of illustration:
1. Select further for the following attributes:
   a. The inner 6 rows (~9%) of the iris image (or some other portion) are unobstructed (no eyelid and eyelash segmentation mask (EESM) there).
   b. EESM (eyelid and eyelash segmentation mask) covering no greater than 50% of the flat iris image.
   c. At least two images of the eye
   (In this example, there are 101 different eyes in this data set.)
2. All pairs of selected images are compared according the following steps:
   a. Use inner 6 rows (or some other number of rows) to correct for rotational misalignment.
   b. Normalize intensity of exposed iris area in both images to mean/average value of 1.
   c. Use EESM's to find the unobstructed iris area common to both images.
   d. Subtract common iris areas and compute mean of the absolutes values.

A histogram of results for different eyes is illustrated in FIG. 2D. In this example, there are 95,953 such comparisons in this data set.

A histogram of minimum differences for the same eye is illustrated in FIG. 2E. If a decision threshold of 0.056 is selected for instance, the example provides FAR=0% and FRR=27%. Based on a visual examination of the eye crop images associated with the worst 5 same eye matches, these had only 2 available images and showed various degrees of illumination and focus differences. With improved illumination and focus control, and acquisition of more good images, the FRR can be substantially reduced.

Using iris biometric matching directly from iris images can allow a biometric recognition system to leverage additional details of the iris (that would otherwise be lost due to an iris encoding process) to perform recognition with greater accuracy. Using iris biometric matching directly from iris images can thus be more secure than using iris codes. Using iris biometric matching directly on iris images can be simpler in computation, and thus faster than using iris codes, as the latter uses additional processing resources to perform the encoding for instance.

Figure 2F:
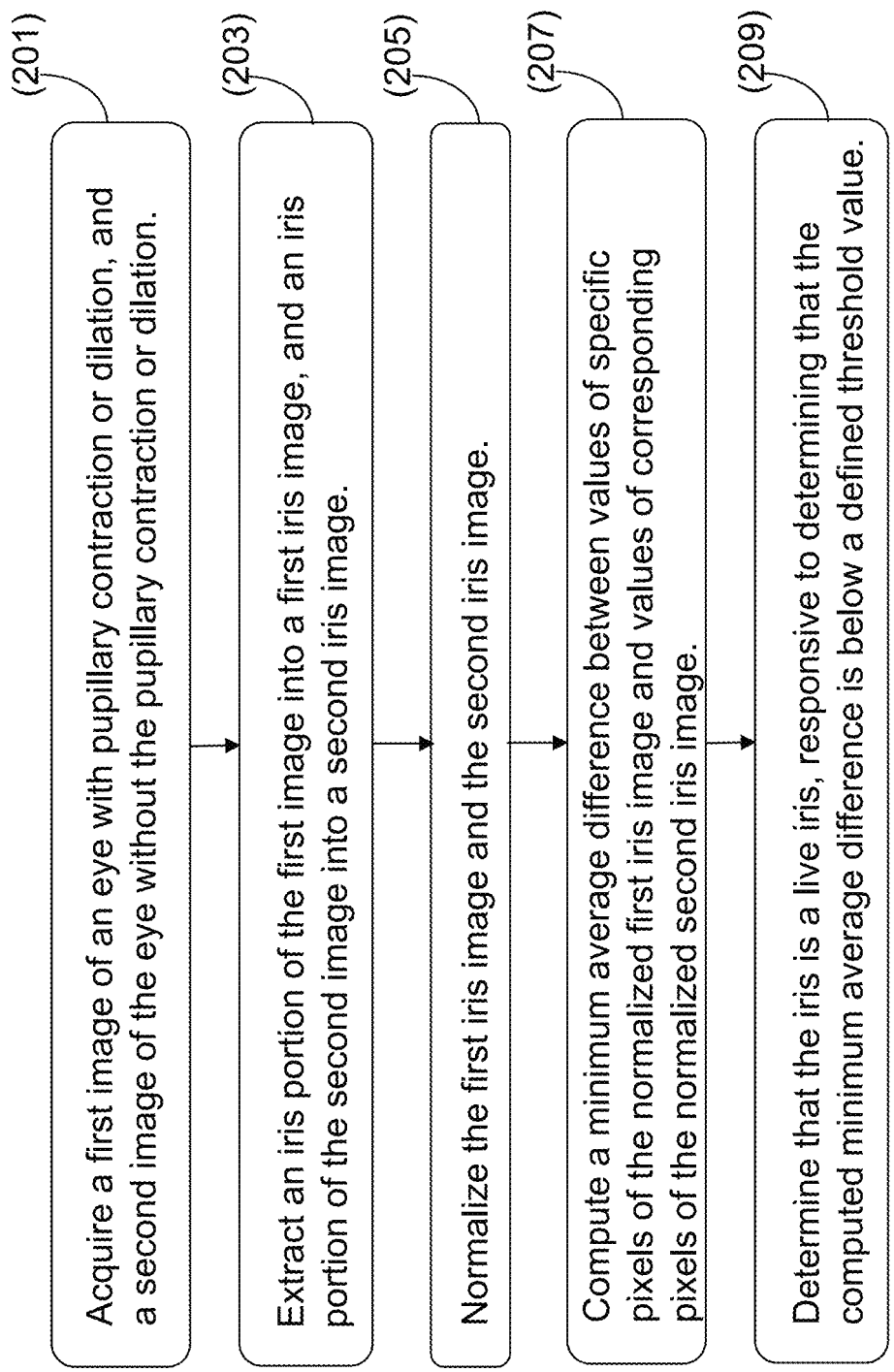
FIG. 2F is a flow diagram illustrating a method for iris liveness determination, according to some embodiments.

Referring now to FIG. 2F, one embodiment of a method for detecting the presentation of a false iris printed on a contact lens is depicted. The method can include acquiring, by a sensor, a first image of an eye with pupillary constriction, and a second image of the eye without the pupillary constriction (201). The method can include extracting an iris portion of the first image into a first iris image, and an iris portion of the second image into a second iris image (203).

The method can include normalizing the first iris image and the second iris image, the normalized first iris image having same dimensions as that of the normalized second iris image, in pixels (205). The method can include computing a minimum average difference between values of specific pixels of the normalized first iris image and values of corresponding pixels of the normalized second iris image (207). The specific pixels can correspond to an innermost annular portion of the iris. The method can include determining that the iris is a live iris, responsive to determining that the computed minimum average difference is below a defined threshold value (209).

Figure 2G:
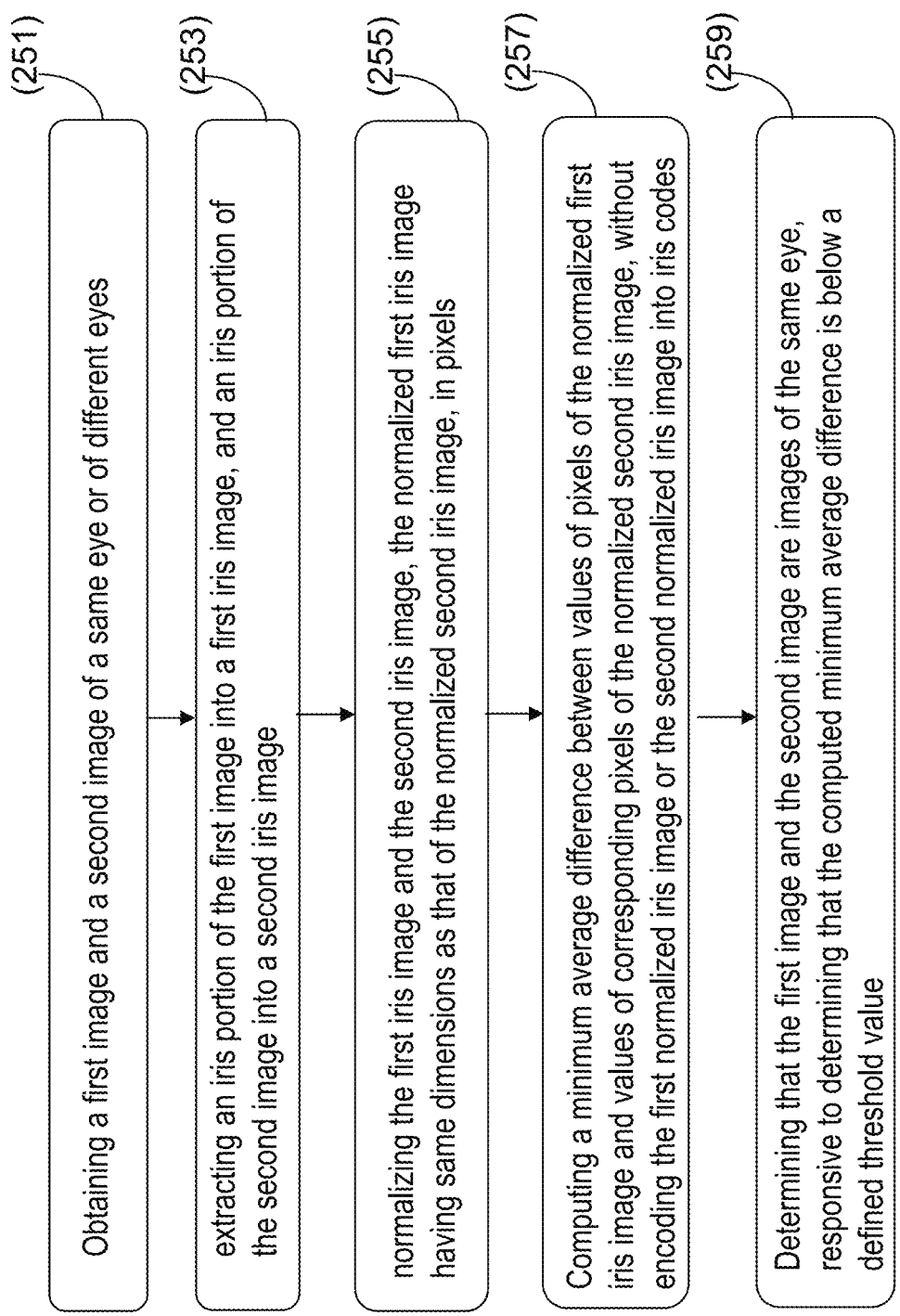
FIG. 2G is a flow diagram illustrating a method for iris biometric matching, according to some embodiments.

Referring now to FIG. 2G, one embodiment of a method for performing biometric matching is depicted. The method can include obtaining a first image and a second image of a same eye or of different eyes (251). The method can include extracting an iris portion of the first image into a first iris image, and an iris portion of the second image into a second iris image (253). The method can include normalizing the first iris image and the second iris image, the normalized first iris image having same dimensions as that of the normalized second iris image, in pixels (255). The method can include computing a minimum average difference between values of pixels of the normalized first iris image and values of corresponding pixels of the normalized second iris image, without encoding the first normalized iris image or the second normalized iris image into iris codes (259). The method can include determining that the first image and the second image are images of the same eye, responsive to determining that the computed minimum average difference is below a defined threshold value (259).

It should be noted that certain passages of this disclosure can reference terms such as "first" and "second" in connection with devices, portions, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, Matlab, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

I claim:

1. A method for iris liveness determination, comprising:
acquiring, by a sensor, a first image of an iris with pupillary constriction, and a second image of the iris without the pupillary constriction;
extracting an iris portion of the first image into a first iris image, and an iris portion of the second image into a second iris image;
normalizing the first iris image and the second iris image, the normalized first iris image having same dimensions as that of the normalized second iris image, in pixels;
computing a minimum average difference between values of specific pixels of the normalized first iris image and values of corresponding pixels of the normalized second iris image, the specific pixels corresponding to an innermost annular portion of the iris; and
determining that the iris is a live iris, responsive to determining that the computed minimum average difference is below a defined threshold value.

2. The method of claim 1, wherein computing the minimum average difference comprises:
circular-shifting the normalized first iris image relative to the normalized second iris image, over a plurality of circular-shifting steps;
computing, corresponding to each of the plurality of circular-shifting steps, an average difference between values of pixels of the normalized first iris image corresponding to the innermost annular portion of the iris, and values of corresponding pixels of the normalized second iris image corresponding to the innermost annular portion of the iris; and
determining the minimum average difference from the computed average differences corresponding to the plurality of circular-shifting steps.

3. The method of claim 2, wherein computing the average difference comprises computing a mean of absolute differences between the values of pixels of the normalized first iris image corresponding to the innermost annular portion of the iris, and corresponding values of pixels of the normalized second iris image corresponding to the innermost annular portion of the iris of the normalized second iris image.

4. The method of claim 1, wherein the innermost annular portion of the iris corresponds to less than half of a total surface area of the iris.

5. The method of claim 1, wherein normalizing the first iris image comprises normalizing intensity values of pixels in the first iris image.

6. The method of claim 1, wherein normalizing the first iris image comprises normalizing intensity values of pixels in the first iris image to have a mean corresponding to a defined value.

7. The method of claim 1, comprising computing the minimum average difference without encoding the first normalized iris image or the second normalized iris image into iris codes.

8. The method of claim 1, wherein normalizing the first iris image comprises generating a flat iris image of x rows of pixels by y columns of pixels, wherein x and y are integers.

9. The method of claim 8, wherein the specific pixels of the normalized first iris image corresponding to the innermost annular portion of the iris, correspond to pixels in the top or bottom N rows of pixels of the flat iris image.

10. The method of claim 1, further comprising providing a first level of light while acquiring the first image of the iris, and providing a second level of light while acquiring the second image of the iris.

11. A system for iris liveness determination, the system comprising:
- a sensor configured to acquire a first image of an iris with pupillary constriction, and a second image of the iris without the pupillary constriction; and
- an image processor in communication with the sensor, the image processor configured to:
  - extract an iris portion of the first image into a first iris image, and an iris portion of the second image into a second iris image;
  - normalize the first iris image and the second iris image, the normalized first iris image having same dimensions as that of the normalized second iris image, in pixels;
  - compute a minimum average difference between values of specific pixels of the normalized first iris image and values of corresponding pixels of the normalized second iris image, the specific pixels corresponding to an innermost annular portion of the iris; and
  - determine that the iris is a live iris, responsive to determining that the computed minimum average difference is below a defined threshold value.

12. A system for iris biometric matching, the system comprising:
- a sensor configured to acquire a first image for biometric matching with a second image, the first image and the second image corresponding to images of a same eye or of different eyes; and
- an image processor in communication with the sensor, the image processor configured to:
  - extract an iris portion of the first image into a first iris image, and an iris portion of the second image into a second iris image;
  - normalize the first iris image and the second iris image, the normalized first iris image having same dimensions as that of the normalized second iris image, in pixels;
  - compute a minimum average difference between values of pixels of the normalized first iris image and values of corresponding pixels of the normalized second iris image, without encoding the first normalized iris image or the second normalized iris image into iris codes; and
  - determine that the first image and the second image are images of the same eye, responsive to determining that the computed minimum average difference is below a defined threshold value.

* * * * *